UNITED STATES PATENT OFFICE.

MAXWELL O. JOHNSON, OF WAIPIO, TERRITORY OF HAWAII.

PROCESS OF TREATING FRUIT-JUICE.

1,362,868.      Specification of Letters Patent.      Patented Dec. 21, 1920.

No Drawing.      Application filed September 12, 1919. Serial No. 323,234.

*To all whom it may concern:*

Be it known that I, MAXWELL O. JOHNSON, a citizen of the United States, residing at Waipio, in the county of Honolulu, Territory of Hawaii, have invented certain new and useful Improvements in Processes of Treating Fruit-Juice, of which the following is a specification.

The invention relates to a process or processes for concentrating fruit juices and for producing fruit syrups, and more particularly to such a process or processes whereby the aqueous or equivalent element or component of the juice is frozen and removed from the juice to effect the concentration, together with subsequent steps for completing, perfecting, adapting or rendering permanent the resultant product.

Objects and advantages of the invention will be set forth in part hereinafter, and in part will be obvious herefrom, or may be learned through practice with the invention.

The invention consists in the novel steps and processes herein shown and described.

In the embodied manner of carrying out the invention which is herein described by way of example, it is applied to the concentration and preservation of pineapple juice, and the making of pineapple syrup, although in most of its features, the invention is applicable to the concentration of fruit juices generally.

Referring now, by way of example, to the handling or processing of pineapple juice in accordance with the invention, the juice is preferably extracted by pressing the uncooked and unheated fruit. With many fruits, however, heating and the addition of water are necessary or desirable for the extraction of the juice.

In the commercial process of canning pineapples, large quantities of the juice are produced, which are not utilized in the canning process. In the canning process also a very considerable portion of the pineapples is not utilized, and is merely waste so far as the canning is concerned, as only the central part of the fruit is cored out in disk form and canned. By the present process, the waste or surplus juice resulting from the coring of the fruit for canning, and also the juice from the waste or unused portions of the pineapple is saved, although the entire fruit may be utilized if desired. With other fruits the process of juice extraction will be varied in ways which are well understood by those skilled in the art.

The juice is concentrated without boiling down, or employing other or like steps which destroy the characteristic flavor of the pineapple, or other fruit, which deterioration is probably caused by the evaporation or breaking down of essential or other organic compounds which impart the characteristic flavors to the various fruits.

By my invention the juice is concentrated by freezing, whereby the water, or equivalent elements or components of the juice, separates out as ice, and the sugars, acids, and flavoring matters of the pineapple or other fruit are concentrated in the unfrozen liquid. This freezing may be effected with an ordinary ice-making plant, the juice being pumped or poured into the usual ice-cans of such a plant, and frozen, or partly frozen to any required or desired degree. The degree to which the juice is concentrated will depend on the amount of freezing which takes place, and this in turn depends upon the length of time of the freezing action.

In commercial practice, I prefer to preliminarily cool the juice by passing it through coils surrounded by the cold brine or other liquid used in the ice plant. The juice may be chilled also, or additionally, by using the ice which has been produced from, and separated out of, previously frozen juice. This procedure will shorten the time of freezing in the cans of the ice plant.

By continuing the freezing action for a sufficient length of time, or by repeated freezing, the original or natural juice may be brought to a concentration of five or six times that of the original juice. In practical commercial work, it is frequently desirable to produce a concentrated juice of about three times the strength of the original or natural juice. In practice I have found that with an ice machine having cans of three hundred pounds capacity, this concentration can be effected in from thirty-six to forty-eight hours, the temperature of the brine or other freezing liquid being also a factor. With other juices different degrees or ratios of concentration will be found desirable. It is understood that the figures and proportions given are illustrative and exemplary and are not restrictive of the invention.

When the juice is frozen in the ice cans as described, the freezing progresses from the walls of the cans inwardly, and there is usually left within the ice block a central cavity containing a large proportion of the concentrated juice. When the desired degree of concentration has been reached and the freezing period has been completed, it is advisable to drain off the concentrated juice from this interior cavity. The ice is then broken into small pieces, and the juice adherent thereto is separated and collected. In commercial practice, I prefer to run the block of ice into an ice-breaking machine, wherein the ice is broken into quite small pieces. A drain may be supplied at this point which will gather and carry off an additional quantity of the concentrated juice. The remainder of the juice, which is still adherent to the ice fragments, is then separated by a centrifugal machine, although other separating means may be employed if desired.

As already indicated, the freezing operation or process may be repeated for the purpose of obtaining a still greater concentration of the juice, where this is desired. In the case of pineapple juice, the original or natural juice will frequently or usually test eleven or twelve degrees with the Brix hydrometer (although some juices will test fifteen degrees or higher), corresponding roughly to eleven or twelve per cent. of sugar. I have found it advantageous in actual practice to concentrate the natural juice to about thirty degrees Brix, as the most practical concentration for commercial work.

For most uses, it is desirable or necessary to clarify the concentrated juice, as in the case of pineapples, the juice obtained by the concentration process is a brown colored, cloudy and slightly viscous liquid. Clarification will be found desirable or necessary with other juices as well.

In the clarification of pineapple juice I have found it preferable to add to the juice diatomaceous earth, and then to heat, settle and filter the juice. Diatomaceous earth, such as kieselguhr, silicious earth or filter cel, assists greatly the filtration of the concentrated juice. Soft particles are formed by the coagulation of the proteids upon heating pineapple juice, which particles clog the filters unless some filtration aid is added. Other clarification agents that might be used are kaolin, Spanish clay, casein, egg albumen, etc. In practice I have found it desirable to use between one and three per cent. of diatomaceous earth, although this proportion or percentage may be very widely varied.

To assist both in the clarification of the juice and to secure or effect rapid filtration, heating is desirable, and with many juices it is practically necessary. Pineapple juice, and other fruit juices as well, contain a considerable quantity of proteid and possibly other matter which is coagulated by heat. Heating at this stage of the process will remove this undesirable matter or matters, so that there is no subsequent precipitation thereof, or clouding of the juice, in subsequent sterilization by the action of heat. By heating the juice, fairly rapid filtration is effected, and in the case of pineapple juice a bright and clear golden liquid is obtained. The application of heat for a brief period and for the temperatures desired or required does not affect the flavor or aroma of the juice, but leaves them unimpaired, and absolutely free from the very different and objectionable flavors imparted by boiling or protracted cooking. In practice it is preferable to heat the juice at this time to a somewhat higher temperature than that subsequently applied for the purpose of sterilization, as clouding and further precipitation of proteid during the sterilization process is thereby avoided.

As a practical step in commercial manufacture, the hot juice may be settled prior to and as an aid to filtration, although this step may be dispensed with. After settling, the juice may be decanted or siphoned to the filters.

In the process or step of filtration, and referring to pineapple juice as an example, the commercial filters known as Karl Kiefer filters may be employed with paper pulp pads, although other devices may be employed with equally satisfactory results and with other juices. Also with certain juices and in certain cases, careful settling and decanting or siphoning may be substituted for the filtering, although in most cases the filtering will be found most satisfactory.

The sludge or residue from the filtration in a commercial plant has considerable value, and may be utilized as a fertilizer. The settlings from the concentrated juice will consist of the diatomaceous earth, the coagulated proteid and other matters in the pineapple juice and also any fiber and other solid matter formerly in suspension in the fresh juice. This will form a sludge which will hold a considerable portion of the concentrated juice. As it is desirable to recover this juice, and as the coagulated proteid will contain a high percentage of nitrogen and be valuable as a fertilizer if separated from the juice, it is desirable to separate the liquid and solid portions of the sludge as thoroughly as possible. This may be done in any suitable manner so far as concerns many features of the invention. One manner of effecting this would be to put the sludge through an ordinary plate and frame filter press, or other filter press adapted to the handling of press cakes. If the filtered juice from the sludge is of good enough quality, and the press is protected from the action of the acid juice, the juice can be added directly to the large bulk of juice from the Karl Kiefer filter already referred to.

If the juice filtered from the sludge is not perfectly clear, but is uncontaminated by the press, it can be added to the next batch of juice in the settling tanks.

If the juice is contaminated by the press or is not of as good quality as desired, it can be limed with burnt lime, milk of lime or carbonate of lime, and filtered after heating and settling. The citrate of lime can be separated as a valuable by-product and the syrup obtained used for canned goods or possibly marketed directly as a syrup. The sludge can be limed directly, heated and put through the filter press and the syrup used as described above, or as hereinafter described.

After as much as possible of the concentrated juice in the sludge is drained off in the filter press, the press cake should be washed. If the juice is uncontaminated by the press, and no liming is resorted to previous to filteration, the first washing can be added to the fresh juice in the ice cans, as the washing water will probably dilute the remaining concentrated juice in the sludge to about the strength of fresh juice. After the press cake has been washed it can be applied directly to the fields as a fertilizer, or it may be first dried, and used or sold as a fertilizer.

The clarification of the juice may precede the concentration thereof, should this be desired, but this is not economical by reason of the much greater quantity of liquid which would have to be filtered or otherwise handled.

The filtered and concentrated juice, in the case of pineapples, is a clear, golden, slightly viscous liquid. I have found it advantageous and desirable to concentrate the juice to about three times its original strength, as previously indicated, which is about thirty degrees Brix (which corresponds to the Balling hydrometer, which is in extensive use in the United States for syrup determination). The reading of thirty degrees Brix signifies a specific gravity of the liquid corresponding to thirty per cent. sugar content. It will be understood that other concentrations, or degrees of concentration, may be effected in the manner indicated. Pineapple juice of thirty degrees Brix concentration contains usually about four per cent. of citric acid and about twenty-six per cent. of total sugars. When this liquid is diluted with two parts of water it corresponds substantially in strength and in flavor to fresh pineapple juice. It is a delicious and refreshing beverage for domestic and table use, for fountain dispensation and otherwise.

The foregoing will be found by many, when used as a beverage to be too acid, and it may be sweetened by the addition of sugar to the concentrated juice during the process of manufacturing. By sweetening the juice during the process of manufacturing, a proper flavor is secured, and the added sugar assists in sterilizing and preserving the juice. In practice I prefer to use refined cane sugar as the sweetening agent, although other sugars, such as corn syrup, could be used. The amount of sugar to be added will depend on the degree of concentration of the juice.

In the case of the thirty degree Brix juice already described, I have found it desirable to add about three pounds of sugar to a gallon of the juice. This mixture will produce a syrup of about forty-eight to fifty degrees Brix, which will contain from 3 to 3.5 per cent. citric acid. This syrup diluted with four parts of water makes a very delicious beverage, either with plain water, or with carbonated or other charged water. The percentage of sugar in fresh pineapple juice and in the concentrated juice is about seven or eight times the percentage of acid calculated as citric. In sweetening the concentrated juice so as to obtain the most desirable flavor, as at present advised and preferred, sugar should be added so that the percentage of sugars in the syrup is roughly fifteen times the percentage of acid calculated as citric, although this may be varied very much, being reduced as low as eight times or increased to 100 times, as found desirable or necessary.

The product, whether the concentrated and preferably clarified juice, or whether the syrup produced by the addition of sugar to the concentrated juice, is sterilized, the sterilization being preferably effected by subjecting the liquid to a sterilizing heat. In commercial practice, the sterilization will be effected in conjunction with the bottling or other packaging of the liquid. Referring to pineapple syrup, the syrup is preferably heated before it goes into the bottles to about 170 degrees Fahrenheit, to assist in the subsequent sterilization. The bottles also are preferably sterilized with steam or hot water previous to being filled. The bottles are filled with the hot liquid and are then sealed. To effect or to perfect the sterilization, the bottles are placed in a hot water bath for thirty minutes with the temperature of the water at about 175° F., although the time and temperature may be varied considerably. As has already been stated, the clarifying temperature for the juice is preferably somewhat higher than the sterilizing temperature, so as to avoid clouding and precipitation of proteids during the sterilizing process. The sterilization may be effected, when found desirable or advisable, by heating the juice to sterilizing temperature, and sterilizing the bottles, preferably by hot water or steam, and running the hot juice into the bottles and sealing.

When desired, the acid in the juice may be neutralized in whole or in part, and where this is desired, it may be accomplished by "liming." This could be done by treating the juice with calcium oxid or calcium hydroxid, or with calcium carbonate, at any stage in the process, either before concentration by freezing or afterward.

The heating and filtering could be done first, the lime compound added, and the citrate of lime obtained could be filtered off or otherwise separated as a by-product. Or if desired, the lime could be added to the unclarified juice and the citrate of lime filtered off during the filtration operation together with the coagulated proteid.

The concentrated juice obtained by thus freezing, "liming" and filtering provides a superior syrup for use in canned goods, being much superior to the ordinary syrup prepared by heat or boiling from pineapple juice. Such a neutralized concentrated juice is unacceptable as a beverage to most persons, however, on account of the lack or absence of acid, which acid is the "life" of the juice.

It will be understood that changes may be made, within the scope of the appended claims, from the present preferred form or manner of practising the invention herein described without departing from the principles of the invention and without sacrificing its chief advantages.

What I claim as my invention is:—

1. The process of treating fruit juice while preserving the natural aroma and delicate flavor thereof, consisting in concentrating the fruit juice by freezing a part of the water content and separating the concentrated fruit juice from said frozen water content, clarifying the juice by heating to a degree sufficient to cause a clouding or coagulation of the readily coagulable substances therein but insufficient to impair the flavor or aroma thereof, removing the clear juice and sterilizing at a temperature to prevent fermentation and at a less degree than the clarifying temperature, thereby avoiding subsequent clouding of the clear juice.

2. The process of treating fruit juice while preserving the natural aroma and delicate flavor thereof, consisting first in concentrating the fruit juice by freezing a part of the water content and separating the concentrated juice from the frozen water content, clarifying the juice by heating to a degree sufficient to cause a clouding or coagulation of the readily coagulable substances therein, but insufficient to impair the flavor or aroma thereof, filtering the juice to remove the coagulated matter therefrom and finally sterilizing at a temperature to prevent fermentation and at a less degree than the clarifying temperature, thereby avoiding subsequent clouding of the clear juice.

3. The process of treating fruit juice while preserving the natural aroma and delicate flavor thereof, consisting first in concentrating the fruit juice by freezing a part of the water content and separating the concentrated juice from the frozen water content, adding to the concentrated juice a clarifying agent, heating the juice to a degree sufficient to cause a clouding or coagulation of the readily coagulable substances therein, but insufficient to impair the flavor or aroma thereof, filtering the juice to remove the coagulated matter therefrom and finally sterilizing the juice at a temperature to prevent fermentation and at a less degree than the clarifying temperature, thereby avoiding a subsequent clouding of the clear juice.

4. The process of treating fruit juice while preserving the natural aroma and delicate flavor thereof, consisting in clarifying the juice by heating to a degree sufficient to cause a clouding or coagulation of the readily coagulable substances therein, but insufficient to impair the flavor or aroma thereof, removing the clear juice and sterilizing at a temperature to prevent fermentation and at a temperature of less degree than the clarifying temperature, whereby said juice is sterilized without causing a subsequent clouding of the clear juice.

5. The process of treating fruit juice while preserving the natural aroma and delicate flavor thereof, consisting of adding to the juice a clarifying agent, heating the juice and clarifying agent to a degree sufficient to cause a clouding or coagulation of the readily coagulable substances therein, but insufficient to impair the flavor or aroma thereof, filtering the juice and finally sterilizing the clear juice at a temperature to prevent fermentation and at a less degree than the clarifying temperature, whereby the juice is sterilized without causing a subsequent clouding of the clear juice.

6. The process of treating pineapple juice while preserving the natural aroma and delicate flavor thereof, consisting in concentrating the juice by freezing a part of the water content and separating the concentrated juice from said frozen water content, clarifying the concentrated juice and sterilizing at a temperature to prevent fermentation and to avoid clouding.

In testimony whereof, I have signed my name to this specification, in the presence of two subscribing witnesses.

MAXWELL O. JOHNSON.

Witnesses:
JAMES WAKEFIELD,
ADAM ORNELLES.